(12) United States Patent
Takahara et al.

(10) Patent No.: US 6,759,093 B2
(45) Date of Patent: Jul. 6, 2004

(54) METHOD FOR MANUFACTURING WET TYPE FRICTION MATERIAL

(75) Inventors: Hiroshi Takahara, Fukuroi (JP); Shunya Matsuda, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 15 days.

(21) Appl. No.: 09/987,114

(22) Filed: Nov. 13, 2001

(65) Prior Publication Data

US 2002/0058728 A1 May 16, 2002

(30) Foreign Application Priority Data

Nov. 13, 2000 (JP) ........................................ 2000-386145

(51) Int. Cl.⁷ ................................................ B05D 1/38
(52) U.S. Cl. ........................ 427/382; 427/387; 427/411
(58) Field of Search ................................. 427/382, 387, 427/411, 379, 381; 162/135, 136, 137

(56) References Cited

U.S. PATENT DOCUMENTS

| 3,647,722 A | * | 3/1972 | Albertson et al. ........... 162/155 |
| 5,529,666 A | * | 6/1996 | Yesnik ........................ 162/136 |

FOREIGN PATENT DOCUMENTS

| GB | 1078773 | * | 8/1967 |
| JP | 59-071382 | * | 4/1984 |
| JP | 59-080539 | * | 5/1984 |

* cited by examiner

*Primary Examiner*—Erma Cameron
(74) *Attorney, Agent, or Firm*—Miles & Stockbridge P.C.

(57) ABSTRACT

A method for manufacturing a wet type friction material obtained by immersing binding agent into a paper body comprised of fiber base material and filler, comprises a first immersing step for immersing first binding agent into said paper body, a second immersing step for immersing second binding agent into said paper body after said first immersing step and a heating and curing step for heating and curing said paper body into which said first and second binding agents were immersed.

15 Claims, 3 Drawing Sheets

METHOD FOR MANUFACTURING WET TYPE FRICTION MATERIAL

BACKGROUND OF THE INVENTION

1. Field of the Invention

The present invention relates to a method for manufacturing a wet type friction material, particularly used in a wet type clutch.

2. Related Background Art

In automatic transmissions of vehicles, for example, motor vehicles, a multi-plate clutch or a lock-up clutch has been used, and wet type friction materials have been used in frictional engagement elements for such a clutch. FIG. 3 is a front view of a friction plate used in a multi-plate clutch. The friction plate 1 is constituted by adhering wet type friction material(s) 3 to one side or both sides of a core plate 2.

The wet type friction material 3 is generally produced by making paper comprised of fiber base material such as natural pulp fibers, organic synthetic fibers or inorganic fibers and filler/friction adjusting agent such as diatom earth or cashew resin in a wetting manner and then by immersing resin binding agent comprised of thermosetting resin into it and by thermosetting it.

There are various thermosetting resin materials, and such resin materials have been developed more and more, but they have inherent merit(s) and demerit(s).

SUMMARY OF THE INVENTION

Therefore, an object of the present invention is to provide a method for manufacturing a wet type friction material, in which demerit of one binding agent is compensated by the other binding agent thereby to provide excellent effect. More specifically, an object of the present invention is to suppress weakness or tenderness which is demerit of silicon resin by using phenol resin while maintaining elasticity or flexibility which is merit of the silicon resin and high coefficient of friction accordingly, and to provide a method for manufacturing a wet type friction material in which tenderness is suppressed.

To achieve the above object, the present invention provides a wet type friction material having fiber base material, filler and binding agent and comprising a first layer including first binding agent and a second layer including second binding agent.

Further, the present invention provides a method for manufacturing a friction plate obtained by fixing a wet type friction material to a core plate, in which the wet type friction material includes a first layer immersed by phenol resin and a second layer immersed by phenol resin and silicon resin and the first layer side is secured to the core plate and the second layer side is used as a frictional engagement surface.

Further, the present invention provides a method for manufacturing a wet type friction material obtained by immersing binding agent into a paper body comprised of fiber base material and filler, comprising a first immersing step for immersing first binding agent into the paper body, a second immersing step for immersing second binding agent into the paper body after the first immersing step, and heating and curing step for heating and curing the paper into which the first and second binding agents are immersed.

In order to manufacture the wet type friction material according to the present invention, a paper body is firstly formed. The paper body is formed by making paper, in normal manner, from slurry liquid obtained by dispersing fiber base material and filler/friction adjusting agent into water at a predetermined ratio and drying the paper. The paper body is not limited to the above-mentioned one.

As the fiber base material, for example, one or more of inorganic fibers such as glass fiber, rock wool, potassium titanate fiber, ceramic fiber, silica fiber, silica/alumina fiber, calion fiber, bauxite fiber, kayanoid fiber, boron fiber, magnesia fiber, metallic fiber and the like and organic fibers such as link pulp, wood pulp, synthetic pulp, polyester fiber, polyamide fiber, polyimide fiber, polyvinyl denaturation alcohol, polyvinyl chloride fiber, polypropylene fiber, polybenzo imidal fiber, acrylic fiber, carbon fiber, phenol fiber nylon fiber, cellulose fiber, aramid fiber and the like may be used.

As the filler/friction adjusting agent, for example, one or more of barium sulfate, calcium carbonate, magnesium carbonate, silicon carbide, boron carbide, titanium carbide, silicon nitride, boron nitride, alumina, silica, zirconia, cashew dust, rubber dust, diatom earth, talc, calion, magnesium oxide, molybdenum disulfide, nitrile rubber, acrylonitrile butadiene rubber, styrene butadiene rubber, silicon rubber, fluororubber and the like may be used.

Phenol resin is used as the first binding agent. The phenol resin is not particularly limited, but, for example, pure phenol resin or epoxy denaturation phenol resin may be used.

Silicon resin is used as the second binding agent. Cured material of hydrolysis liquid of silane coupling agent is used as the silicon resin. The hydrolysis liquid of silane coupling agent can be obtained by pouring silane coupling agent (as main material) and water (and solvent, if necessary) by mixing and agitating these substances for a predetermined time period (for example, about 3 to 5 hours) under a room temperature or a relatively low temperature (lower than boiling point of the solvent (low class alcohol); for example, about 40 to 50° C.).

The silane coupling agents having the following chemical formulae (1) and (2) were used.

$$(R^1)(R^2)_n Si(OR^3)_{3-n} \qquad (1)$$

(In the above formula, $R^1$ represents alkyl-amino group having first class amine at its end, $R^2$ and $R^3$ represent alkyl group having independent carbon number of 1 to 3, respectively, and n is the integral number of 0 or 1)

$$(R^4)_m Si(OR^5)_{4-m} \qquad (2)$$

(In this formula, $R^4$ and $R^5$ represent alkyl group having independent carbon number of 1 to 3, respectively, and m is the integral number of 1 or 2)

In the mixture of the silane coupling agents, silane coupling agent having three or more hydrolysis groups is used as at least one of the silane coupling agents represented by the formula (1) or (2). In the hydrolysis liquid of silane coupling agent, it is preferable that blending is effected so that ratio of molar number of the silane coupling agent shown by the formula (2) with respect to molar number of the silane coupling agent shown by the formula (1) becomes 0.1 to 10. Further, in the hydrolysis liquid of silane coupling agent, it is preferable that an adding amount of water is greater than an amount by which half or more of hydrolysis groups in the silane coupling agent an be subjected hydrolysis and smaller than twice of an amount by which all of hydrolysis groups in the silane coupling agent can be subjected to hydrolysis.

More specifically, in the silane coupling agent shown by the above formula (1), as amino silane having three alkoxy group within one molecule, 3-amino propyl trimethoxy silane, 3-amino propyl triethoxy silane, N2-(amino ethyl) 3-amino propyl trimethoxy silane and the like can be listed up, and one of them or mixture thereof can be used. Further, as amino silane having two alkoxy group within one molecule, 3-amino propyl methyl dimethoxy silane, 3-amino propyl methyl diethoxy silane, N-2-(amino ethyl) 3-amino propyl methyl dimethoxy silane, N-2-(amino ethyl) 3-amino propyl methyl diethoxy silane and the like can be listed up, and one of them or mixture thereof can be used.

On the other hand, in the silane coupling agent shown by the above formula (2), 3-functional methyl trimethoxy silane, 3-functional methyl triethoxy silane, 2-functional dimethyl dimethoxy silane, 2-functional dimethyl diethoxy silane can be listed up, and monomer thereof or low compression substance (for example, about 2 to 5 parts) of one or more mixture thereof can be used. Further, silane coupling agent having three or more hydrolysis groups is used as at least one of the silane coupling agents shown by the formulae (1) and (2). It is preferable that the silane coupling agents are compounded so that a ratio of molar number of the silane coupling agent shown by the formula (2) with respect to molar number of the silane coupling agent shown by the formula (1) becomes 0.1 to 10. If the ratio between the molar numbers is below 0.1, since dimensional stability of the wet type friction material is worsened by moisture/water absorbing action due to hydrophilic ability of the cured material, it is not preferable. On the other hand, if the ratio between the molar numbers exceeds 10, since permeating/wetting ability to the base material paper is worsened and physical strength of the wet type friction material is reduced, it is not preferable.

The amount of water to be added is preferably selected so that it is greater than an amount by which half of hydrolysis groups (alkoxy groups) in the silane coupling agent can be subjected to hydrolysis and smaller than twice of an amount by which all of hydrolysis groups in the silane coupling agent can be subjected to hydrolysis, and, more preferably, so that it is grater than an amount by which half of hydrolysis groups (alkoxy groups) in the silane coupling agent can be subjected to hydrolysis and smaller than an amount by which all of hydrolysis groups in the silane coupling agent can be subjected to hydrolysis. If the water amount is below such amount, many non-reacted alkoxy groups will remain in the hydrolysis liquid to worsen the curing ability, which is not preferable in the view point of productivity and energy saving. On the other hand, if the water amount is too much, excessive water will remain in the hydrolysis liquid. The excessive water may cause a phenomenon that density of resin component is increased from interior toward surface layers during the heating and curing, with the result that content of the cored material becomes uneven along the thickness direction of the friction material, thereby affecting a bad influence upon physical strength and friction property. If the adding amount of water exceeds twice of the amount by which all of hydrolysis groups (alkoxy groups) can be subjected to hydrolysis, since excessive water will remain in the hydrolysis liquid, which causes the above-mentioned phenomenon, it is not preferable. If the adding amount of water exceeds the amount by which all of hydrolysis groups (alkoxy groups) can be subjected to hydrolysis, since excessive water will remain in the hydrolysis liquid, although the abovementioned phenomenon occurs, the extent of the phenomenon is within an allowable range. When the adding amount of water is below the amount by which all of hydrolysis groups (alkoxy groups) can be subjected to hydrolysis, since the amount of water remaining in the hydrolysis liquid is small and a uniform material can be obtained, it is more preferable.

Although the solvent is not always inevitable, the solvent is usually used to uniformly mix amino silane and water in the starting mixture liquid, and it is preferable that density of the amino silane in the starting mixture liquid is diluted below 80 weight % by low class alcohol such as methanol, ethanol or propanol. If the density exceeds 80 weight %, binding reaction of silanol groups produced by hydrolysis will be advanced, which may deteriorate storage stability of the hydrolysis liquid.

Phenol resin (constituting the first binding agent) and amino silane (constituting the second binding agent) hydrolysis liquid are immersed into the paper body by an amount corresponding to 20 to 120 weight parts with respect to the base material of 100 weight parts. Then, after dried, heating and curing is effected at a temperature of about 100 to 300° C. for 15 to 30 minutes, thereby obtaining the wet type friction material. Then, the wet type friction material is punched as a part having a predetermined shape, and the part is integrated with a substrate (core plate) on which adhesive is coated, by a heat pressing technique, thereby obtaining the friction plate. The manufacture of the friction plate is not limited to the above method, but other method may be used.

By the hydrolysis, the silane coupling agent (amino silane) is changed to compound including silanol group and amino group in the same molecule, in which condensation polymerization between silanol groups is suppressed due to bipolar ion structure of the molecule based on the amino group, thereby providing relatively stable solution. Since this hydrophilic compound having low molecular weight well permeates into capillary spaces of the paper base material and then the silanol groups repeat the condensation polymerization to create siloxane bonding thereby increasing hardness, the organic and inorganic components in the paper base material are coupled together strongly, thereby providing physical strength greater than that of the phenol resin. Further, the cured material has siloxane bonding (—O—Si—O—) as main skeleton, and, in the siloxane bonding, since a bonding distance between silicon atom and oxygen atom is long and electron density is low, rotation of binding can easily be performed, and the cured material is very flexible and soft. When the cured material of the hydrolysis liquid of such amino silane is used binding agent for the wet type friction material, due to increase in softness, a contact area of the surface of the friction material is increased, and a burnt mark (called as "heat spot") of the other friction material (separator plate) due to local abutment can be eliminated. Further, initial fluctuation of coefficient of friction is small, thereby realizing high and stable coefficient of friction. Further, bonding energy of Si—O in the siloxane bonding is 106 Kcal/mol, which is considerably greater than 85 Kcal/mol which is bonding energy of C—C forming the main skeleton of organic resin such as phenol resin. Since such bonding energy is great, even when the cured material of hydrolysis liquid of amino silane is held under a high temperature for a long time period, the cured material is not deteriorated (decomposition and/or discoloration) and becomes stable with respect to frictional heat generated between frictional sliding surfaces, and the wet type friction material has good heat-resistance and endurance.

DESCRIPTION OF THE PREFERRED EMBODIMENTS

Figure 2:
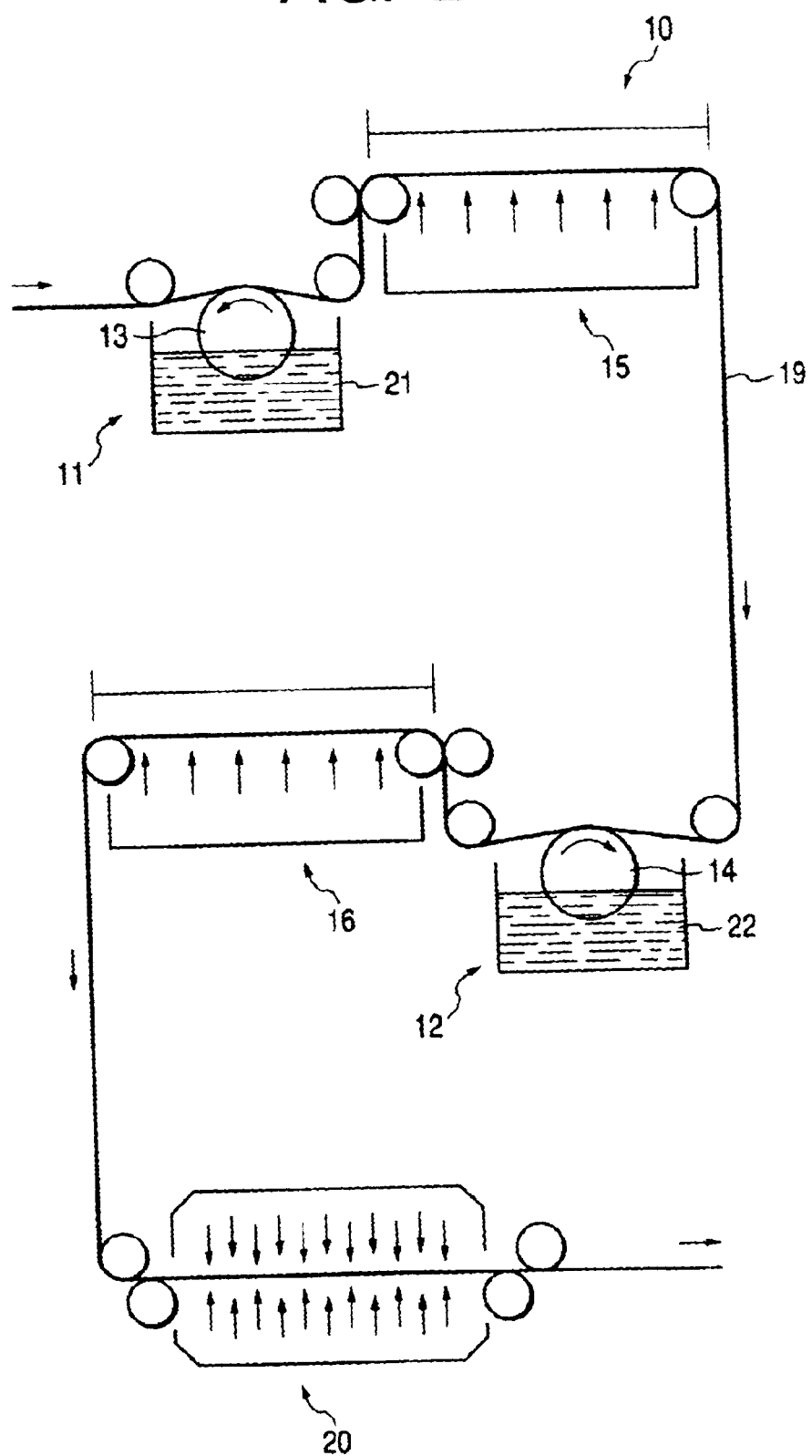
FIG. 2 is a schematic view showing a step for immersing and curing binding agent in a paper body.

First of all, a method for immersing first and second binding agents into a paper body will be explained. FIG. 2 schematically shows manufacturing steps. A manufacturing line 10 includes an immersing device 11 for immersing first binding agent into a paper body 19, a drying device 15 for removing solvent after the first binding agent was immersed, an immersing device 12 for immersing second binding agent, a drying device 16 for removing solvent after the second binding agent was immersed, and heating furnace 20 heating and curing the first and second binding agents.

The immersing devices 11, 12 includes rollers 13, 14, respectively. The rollers 13, 14 are partially immersed into the first and second binding agents 21, 22 to pick up the first and second binding agents 21, 22. When the paper body 19 is being passed on to the roller 13 or 14, the first binding agent 21 or the second binding agent 22 is immersed into the paper body. Further, in order to enhance impregnation of the binding agent into the paper body 19, as shown, the rollers 13, 14 are rotated in counter directions with respect to an advancing direction of the paper body 19. Incidentally, the immersing method for the binding agents is not limited to the above-mentioned one. For example, other methods, direct coating by means of a brush or spraying may be used.

Temperatures within the drying devices 15, 16 are maintained to 80° C. When the paper body 19 is being passed through the drying device, air is blown from below the paper body 19, thereby removing the solvent.

A temperature within the heating furnace 20 is maintained to 230° C. When the dried paper body 19 is being passed through the heating furnace, the binding agents are cured.

Now, a wet type friction material according to the present invention will be described more concretely with reference to examples thereof. However, these examples are merely examples which do not limit the present invention.

EXAMPLE 1

Figure 1:
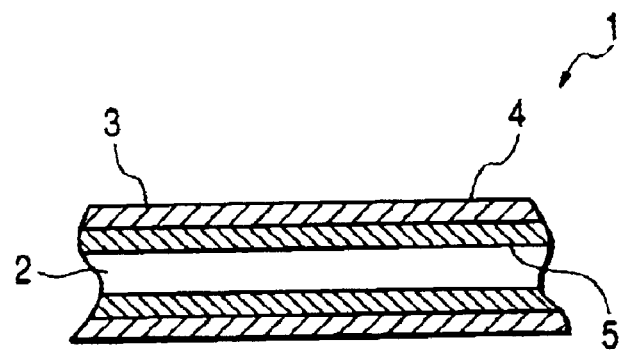
FIG. 1 is an enlarge view showing a main part of a friction plate according to the present invention.
Figure 3:
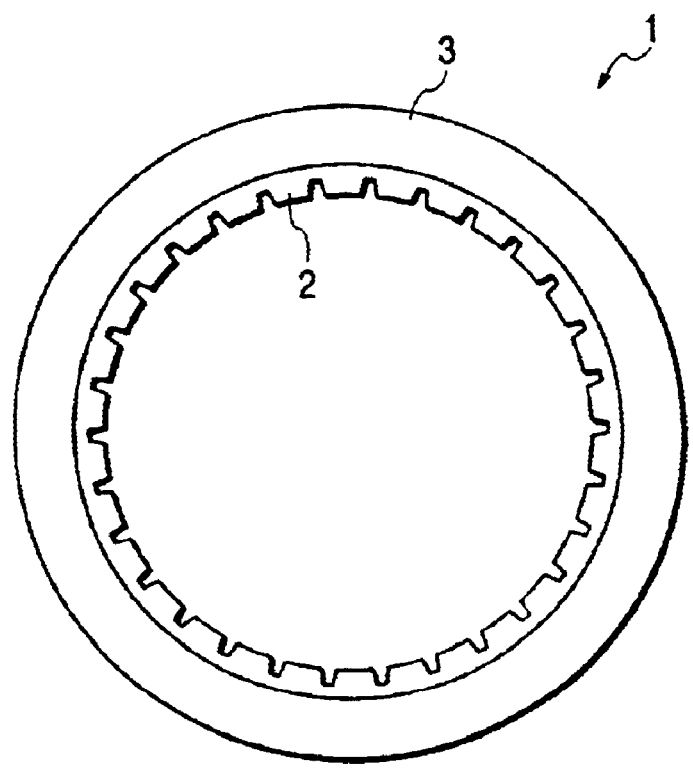
FIG. 3 is a front view of the friction plate.
Figure 4:
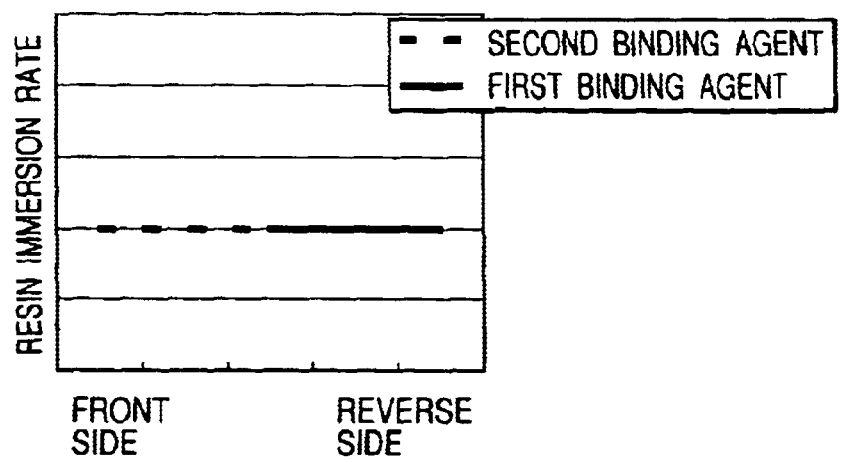
FIG. 4 is a graph showing immersion distribution between first binding agent and second binding agent according to Example 1 of the present invention.

Cellulose fibers of 30 weight % and aramid fibers of 25 weight % were used as fiber base material components and alumina of 20 weight % and diatom earth of 25 weight % were added as filler, and these substances were dispersed into water to obtain slurry liquid. Paper was formed from the slurry liquid and then was dried, thereby obtaining a paper body. Then, first of all, liquid-form pure phenol resin having nonvolatile component (which will become the first binding agent) of 50% was diluted by methanol, and the resulting liquid was immersed into the paper body by an amount corresponding to a half of a thickness of the paper body, and the paper body was dried at a temperature of 80° C. for 30 minutes. On the other hand, ethanol of 93 weight parts and water of 54 weight parts were added to 3-amino propyl triethoxy silane of 221 weight parts and the resulting liquid was reacted at a temperature of 40° C. for 5 hours to obtain hydrolysis liquid of 3-amino propyl triethoxy silane (silane coupling agent) which was prepared as the second binding agent. This liquid was diluted by ethanol and the resulting liquid was immersed into the paper body up to the remaining half thickness thereof. Thereafter, the paper body was dried at a temperature of 80° C. for 30 minutes and then was cured by heating it at a temperature of 230° C. for 30 minutes to obtain a wet type friction material including the binding agents of 40 weight parts with respect to paper of 100 weight parts. Then, the wet type friction material was punched to form a ring having an outer diameter of 126 mm and an inner diameter of 107 mm. Then, the ring was integrated with a ring-shaped metallic core plate by holding the ring within a mold (heated to 200° C.) at pressure greater than 50 Kg/cm$^2$ for 30 seconds, thereby obtaining a friction plate having a diameter of 126 mm and a thickness of 2.04 mm. Incidentally, as a reference, FIG. 1 shows an enlarged side view of the friction plate according to the present invention. The friction plate 1 is constituted by adhering friction materials 3 on both sides of the core plate 2. In this case, the friction materials and the core plate are adhered to each other in such a manner that only phenol resin layers 5 are disposed between the friction materials and the core plate and only silicon resin layers 4 are disposed on frictional engagement surfaces (outer surfaces) of the friction materials. With this arrangement, the performance of the silicon resin is demonstrated regarding coefficient of friction and friction property. Further, as a reference, FIG. 4 shows impregnation distribution of the first and second binding agents into the paper body. Only the first binding agent is immersed into a reverse side from the center of the paper body (i.e., contact side with the core plate), and only the second binding agent is immersed into a front side from the center (i.e., frictional engagement surface side).

EXAMPLE 2

Figure 5:
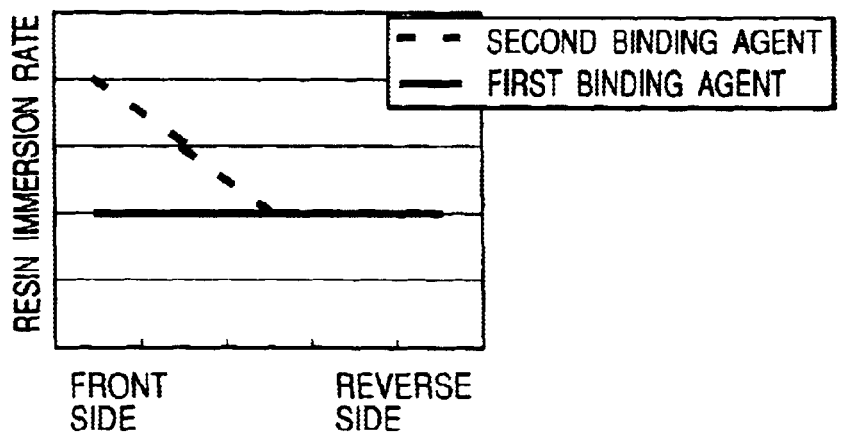
FIG. 5 is a graph showing immersion distribution between first binding agent and second binding agent according to Example 2 of the present invention.

Cellulose fibers of 30 weight % and aramid fibers of 25 weight % were used as fiber base material components and alumina of 20 weight % and diatom earth of 25 weight % were added as filler, and these substances were dispersed into water to obtain slurry liquid. Paper was formed from the slurry liquid and then was dried, thereby obtaining a paper body. Then, first of all, liquid-form pure phenol resin having nonvolatile component (which will become the first binding agent) of 50% was diluted by methanol, and the resulting liquid was immersed into the paper body, and the paper body was dried at a temperature of 80° C. for 30 minutes. On the other hand, ethanol of 93 weight parts and water of 54 weight parts were added to 3-amino propyl triethoxy silane of 221 weight parts and the resulting liquid was reacted at a temperature of 40° C. for 5 hours to obtain hydrolysis liquid of 3-amino propyl triethoxy silane (silane coupling agent) which was prepared as the second binding agent. This liquid was diluted by ethanol and the resulting liquid was immersed into the front surface of the paper body. Thereafter, the paper body was dried at a temperature of 80° C. for 30 minutes and then was cured by heating it at a temperature of 230° C. for 30 minutes to obtain a wet type friction material including the binding agents of 40 weight parts with respect to paper of 100 weight parts. Then, in the same manner as that of the Example 1, a friction plate having a diameter of 126 mm and a thickness of 2.04 mm was obtained. Incidentally, as a reference, FIG. 5 shows impregnation distribution of the first and second binding agents into the paper body. Only the first binding agent is immersed into a reverse side from the center of the paper body (i.e., contact side with the core plate), and the immersing amount of the second binding agent is gradually increased from the center toward the frictional engagement surface side. At the friction engagement surface, the first and second binding agents are immersed at substantially the same ratio.

COMPARATIVE EXAMPLE

Cellulose fibers of 30 weight % and aramid fibers of 25 weight % were used as fiber base material components and alumina of 20 weight % and diatom earth of 25 weight % were added as filler, and these substances were dispersed into water to obtain slurry liquid. Paper was formed from the slurry liquid and then was dried, thereby obtaining a paper body. On the other hand, ethanol of 93 weight parts and water of 54 weight parts were added to 3-amino propyl triethoxy silane of 221 weight parts and the resulting liquid was reacted at a temperature of 40° C. for 5 hours to obtain hydrolysis liquid of 3-amino propyl triethoxy silane (silane coupling agent). This liquid was diluted by ethanol and the resulting liquid was immersed into the paper body. Thereafter, the paper body was dried at a temperature of 80° C. for 30 minutes and then was cured by heating it at a temperature of 230° C. for 30 minutes to obtain a wet type friction material including the binding agents of 40 weight parts with respect to paper of 100 weight parts. Then, in the same manner as those of the Examples, a friction plate having a diameter of 126 mm and a thickness of 2.04 mm was obtained.

Varied amounts of total thickness in the Examples and the Comparative example were examined. Examination conditions were as follows:

Friction surface number: 6 surfaces (three friction plates×2 surfaces)

Friction surface: outer diameter 126 mm, inner diameter 107 mm

Thickness: total thickness (including core plate) 2.04 mm, friction material 0.52 mm/one Number of revolutions: 1900 rpm Inertia: 0.36 Kg·m$^2$ Lubricating oil amount: 0.5 l/min Oil temperature: 100° C.

Fastening pressure: 3628 KPa

Cycle time: fastening: 20 seconds release: 65 seconds

Figure 6:
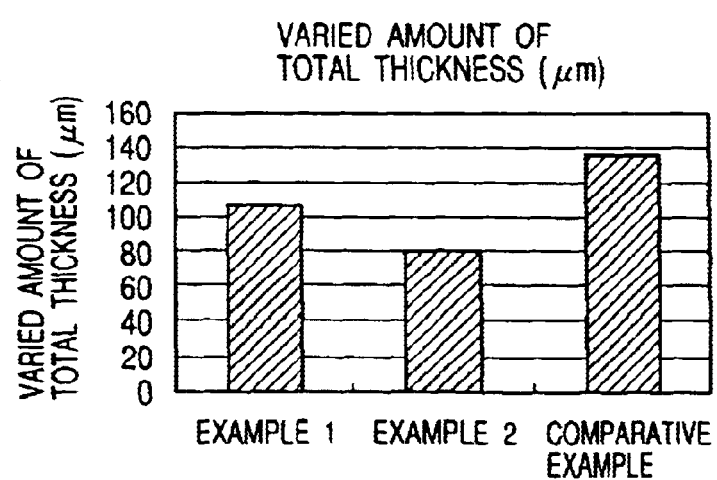
FIG. 6 is a graph showing variation of total thickness between Examples and a Comparative example.

FIG. 6 is a graph showing an examination result. Values shown in the graph are varied amounts of total thickness. As apparent from this graph, it can be seen that the varied amounts of total thickness in the Examples are smaller than that in the Comparative example. From this fact, it can be considered that the tenderness which is demerit of the silicon resin could be suppressed by using the phenol resin as the first binding agent.

The present invention is carried out by the abovementioned manner and can provide an excellent wet type friction material in which demerit of one binding agent is compensated by the other binding agent, and a method for manufacturing such a wet type friction material. According to the present invention, there can be achieved an effect that the tenderness of the wet type friction material caused by the repeated frictional engagements can be suppressed and the friction plate capable of suppressing the tenderness of the wet type friction material can be obtained.

What is claimed is:

1. A method for manufacturing a wet friction material obtained by immersing binding agent into a paper body comprised of fiber base material end filler, comprising:

a first immersing step of immersing first binding agent, that comprises a phenol resin, into said paper body;

a second immersing step of immersing second binding agent, that comprises a silicon resin, into said paper body after said first immersing step; end a heating and curing step of heating and of heating and curing said paper body into which said first and second binding agents were immersed, wherein said friction material has a first layer and a second layer and wherein at said first immersing step and first bonding agent is immersed into said first layer and at said second immersing step said second bonding agent is immersed into said second layer.

2. A method according to claim 1, wherein said binding agents have a solvent therein end drying steps of removing solvent in said binding agents immersed into said paper body are provided between amid first immersing step end said second immersing step and between said second immersing step end said heating and curing step, respectively.

3. A method according to claim 1, wherein only said first binding agent is immersed in said first layer, and said first and second binding agents are immersed in said second layer.

4. A method according to claim 1, wherein the silicon resin of said second binding agent comprises a cured material of hydrolysis liquid of silane coupling agent.

5. A method for manufacturing a wet friction material obtained by immersing binding agent into a paper body comprised of fiber base material and filler comprising;

a first immersing stop of immersing first binding agent comprising phenol resin into said paper body; a second immersing step of immersing second binding agent comprising silicon resin into said paper body after said first immersing stop; and a heating and curing step of heating and curing said paper body into which said first and second binding agents were immersed.

6. A method according to claim 5, wherein said binding agents have a solvent therein end drying steps of removing solvent in said binding agents immersed into said paper body are provided between said first immersing step and said second immersing step and between said second immersing step and said heating and curing step, respectively.

7. A method according to claim 5, wherein said wet friction material has a first layer and a second layer, and at said first immersing step said first binding agent is immersed into said first layer and at said immersing step said second binding agent is immersed into said second layer.

8. A method according to claim 7, wherein only said first binding agent is immersed in said first layer, and said first and second binding agents are immersed in said second layer.

9. A method for manufacturing a friction plate, comprising:

providing a body and a core plate to which a first side of the body is to be secured;

applying a first binding agent, that comprises a phenol resin, to said one side of the body to impregnate a first layer of said body with said first binding agent;

applying a second binding agent, that comprises a silicon resin, to a second side of the body to impregnate a second layer of the body with said second binding agent; and securing the first side of the body to the core plate and leaving the second side of the body exposed as a frictional engagement surface.

10. A method according to claim 9, wherein the first binding agent impregnates both layers of the body and the second binding agent impregnates only the second layer.

11. A method according to claim 9, wherein the body is a paper body comprised of fiber based material and filler.

12. A method according to claim 9, wherein the silicon resin of said second binding agent comprises a cured material of hydrolysis liquid of silane coupling agent.

13. A method according to claim 9, wherein the binding agents in the first and second layers are heated and cured after they have been applied.

14. A method for manufacturing a wet friction material including a body having a front side and a reverse side, comprising:

applying a first binding agent, that comprises a phenol resin, to the reverse side of the body to impregnate a first layer of the body with the first binding agent; and applying a second binding agents; that comprises a silicon resin, to the front side of the body to impregnate a second layer of the body with the second binding agent, wherein the first and second binding agents are selected so that the second binding agent provides a predetermined coefficient of friction and the first binding agent suppresses weakness of the second binding agent while maintaining elasticity of the second binding agent.

15. A method according to claim 14, wherein the body is a paper body.

* * * * *